(12) United States Patent
Vlahovic et al.

(10) Patent No.: US 7,871,107 B2
(45) Date of Patent: Jan. 18, 2011

(54) ROLLOVER PROTECTION DEVICE

(75) Inventors: Josip Vlahovic, Freiberg Am Neckar (DE); Ali Oezkan, Leonberg (DE); Klaus Bohnert, Muehlacker (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 19 days.

(21) Appl. No.: 12/240,111

(22) Filed: Sep. 29, 2008

(65) Prior Publication Data
US 2009/0085337 A1 Apr. 2, 2009

(30) Foreign Application Priority Data
Sep. 28, 2007 (DE) .................. 10 2007 046 536

(51) Int. Cl.
*B60R 21/13* (2006.01)
(52) U.S. Cl. .................................. 280/756
(58) Field of Classification Search ............. 280/756; 296/102, 107.03
See application file for complete search history.

(56) References Cited

U.S. PATENT DOCUMENTS

| | | | | |
|---|---|---|---|---|
| 5,236,219 | A * | 8/1993 | Jambor et al. ............ | 280/756 |
| 5,671,947 | A * | 9/1997 | Henn ...................... | 280/756 |
| 6,805,378 | B2 * | 10/2004 | Berges et al. ............. | 280/756 |
| 6,902,190 | B2 * | 6/2005 | Nass ....................... | 280/756 |
| 6,988,744 | B2 * | 1/2006 | Muller .................... | 280/756 |
| 7,338,076 | B2 | 3/2008 | Hamamoto et al. | |
| 7,350,858 | B2 * | 4/2008 | Hamamoto et al. ...... | 297/188.04 |
| 7,438,317 | B2 * | 10/2008 | Rohner et al. ............ | 280/756 |
| 7,481,458 | B2 * | 1/2009 | Bunsmann et al. ....... | 280/756 |
| 7,481,476 | B2 | 1/2009 | Heiss et al. | |
| 7,540,535 | B2 * | 6/2009 | Kasubke .................. | 280/756 |
| 7,543,878 | B2 * | 6/2009 | Lang ...................... | 296/68.1 |
| 2006/0290124 | A1 | 12/2006 | Kasubke | |
| 2006/0290125 | A1 | 12/2006 | Kasubke | |

FOREIGN PATENT DOCUMENTS

| | | |
|---|---|---|
| EP | 0 722 859 B1 | 7/1996 |
| EP | 1 582 421 A2 | 10/2005 |
| EP | 1902909 A1 | 3/2008 |
| WO | 2005080142 A2 | 9/2005 |

OTHER PUBLICATIONS

European Search Report dated Oct. 19, 2009.

* cited by examiner

*Primary Examiner*—Faye M. Fleming

(57) ABSTRACT

A rollover protection device is disposed behind the vehicle seats of a motor vehicle, in particular a convertible with a convertible top, and has at least one rollover protection cassette containing a rollbar. It is important here that the at least one rollover protection cassette or a housing of the same is a supporting component of a stiffening support which is of multi-part construction and extends in the transverse direction of the vehicle.

11 Claims, 4 Drawing Sheets

_US 7,871,107 B2_

ROLLOVER PROTECTION DEVICE

CROSS-REFERENCE TO RELATED APPLICATION

This application claims the priority, under 35 U.S.C. §119, of German application DE 10 2007 046 536.1, filed Sep. 28, 2007; the prior application is herewith incorporated by reference in its entirety.

BACKGROUND OF THE INVENTION

Field of the Invention

The present invention relates to a rollover protection device which is disposed behind the vehicle seats of a motor vehicle, in particular a convertible with a convertible top, and contains at least one rollover protection cassette with a rollbar. The invention also relates to a motor vehicle equipped with a rollover protection device of this type.

European patent EP 0 722 859 B1, corresponding to U.S. Pat. No. 5,671,947, discloses a rollover protection device of the type in question which contains at least one premanufactured rollover protection cassette, which contains a protective bar, an actuator, and a rollover sensor. In this case, the rollover protection cassette is fastened together with the protective bar and the actuator and also a rollover sensor outside the motor vehicle to a supporting frame forming the receptacle and forms a pre-wired, functional module which can be tested outside the vehicle and can be subsequently fixed to the vehicle body. In this case, the rollover protection cassette is disposed in front of the supporting frame and is connected thereto in this position. In order to be able to obtain the rigidity required for the convertible, the supporting frame has to have a certain profile thickness, as a result of which the rollover protection cassette together with the supporting frame takes up a not inconsiderable construction space in the longitudinal direction of the vehicle.

European patent EP 1 582 421 A2, corresponding to U.S. Pat. No. 7,338,076 B2, discloses a further rollover protection device in which fixed, i.e. nonextendable, rollbars are disposed on a support running in the transverse direction of the vehicle. In this case, the rollover protection device is joined in each case on the longitudinal end sides to corresponding brackets on the vehicle via screws.

SUMMARY OF THE INVENTION

It is accordingly an object of the invention to provide a rollover protection device that overcomes the above-mentioned disadvantages of the prior art devices of this general type, which has an improved or at least a different embodiment which is distinguished in particular by a reduced need for construction space.

With the foregoing and other objects in view there is provided, in accordance with the invention, a rollover protection device disposed behind vehicle seats of a motor vehicle, being a convertible with a convertible top. The rollover protection device contains at least one rollover protection cassette containing a rollbar and a housing. The rollover protection cassette or the housing is a supporting component of a stiffening support being of multi-part construction and extends in a transverse direction of the motor vehicle.

The invention is based on the general concept of integrating the rollover protection device or at least a component thereof, namely a rollover protection cassette, as a supporting component into a stiffening support extending in the transverse direction of the vehicle. The rollover protection device according to the invention has at least one, preferably two, rollover protection cassettes which each contain a rollbar and form part of the stiffening support which is of multi-part construction. The rollover protection cassette is therefore not screwed or welded onto a supporting frame which is already present and extends in the transverse direction of the vehicle, as in the prior art, but rather forms an integral part of such a supporting frame extending in the transverse direction. This affords the particular advantage that the construction space required by the rollover protection device according to the invention, in particular in the longitudinal direction of the vehicle, can be considerably reduced, since, unlike previously, the rollover protection cassette and the supporting frame are disposed consecutively in the direction of travel.

In a further advantageous embodiment of the solution according to the invention, the rollover protection device contains at least the following components: two rollover protection cassettes, a connecting profile which extends in the transverse direction of the vehicle and is disposed between the two rollover protection cassettes, and also two joining arms via which the two rollover protection cassettes can be joined to a vehicle structure. The rollover protection device according to the invention is therefore constructed in the transverse direction of the vehicle as follows: a left joining arm is adjoined by the left rollover protection cassette, with the connecting profile being connected to the side thereof which faces away from the left joining arm. The connecting profile is now adjoined by the right rollover protection cassette and the latter by the right joining arm. In the present case, the rollover protection device according to the invention is therefore of mirror-inverted construction. Of course, it is also conceivable here for individual components, such as, for example, the joining arms or the connecting profile disposed between the two rollover protection cassettes to be matched to a wide variety of vehicle variants while, for example, the two rollover protection cassettes are used as standard for all versions of convertibles.

In an advantageous development of the solution according to the invention, the rollover protection device has a plate-like stiffening element via which it is supported to the rear in the longitudinal direction of the vehicle, in particular against a convertible top store. By this measure, additional stiffening of the supporting frame which is formed by the rollover protection device and extends in the transverse direction of the vehicle can be achieved. In order to further increase the stiffening effect, the plate-like stiffening element can have, for example, stiffening ribs which are oriented in accordance with a previously calculated loading profile. By use of the plate-like stiffening element, not only a three but equally a multi-point mounting of the rollover protection device can therefore be achieved, thus enabling particularly good stiffening of the convertible to be achieved.

A region, which is angled forward in the direction of travel, of at least one joining arm expediently runs approximately horizontally or obliquely downward and is therefore joined to a B pillar in an upper, a central or a lower region thereof. That is to say, the joining of the rollover protection device in each case on the longitudinal sides can be matched to individual requirements, with it being possible, depending on the joining point selected, for the motor vehicle to be additionally stiffened in the transverse direction of the vehicle via the joining arms. In this case, particularly good stiffening of the convertible in the transverse direction of the vehicle is preferably achieved with an angled region, which runs approximately horizontally, of the at least one joining arm and therefore a joining of the joining arm in an upper region of the B pillar.

It goes without saying that the features mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below, where the same reference numbers refer to identical or similar or functionally identical components.

Other features which are considered as characteristic for the invention are set forth in the appended claims.

Although the invention is illustrated and described herein as embodied in a rollover protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
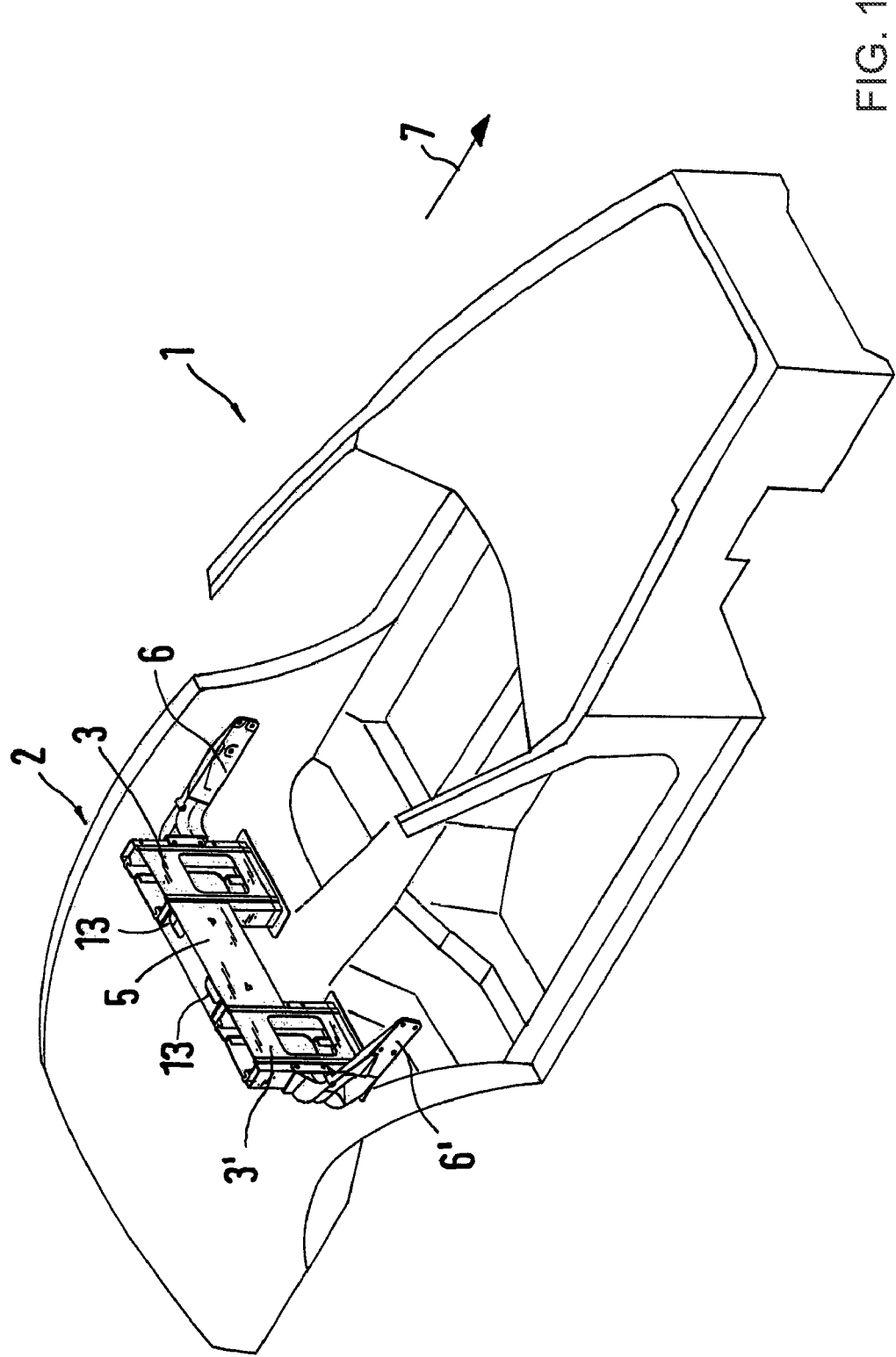
FIG. 1 is a diagrammatic, perspective view of a rollover protection device according to the invention in a state in which it is installed in a motor vehicle.

Referring now to the figures of the drawing in detail and first, particularly, to FIG. 1 thereof, there is shown a motor vehicle 1 which is configured as a convertible and has a rollover protection device 2 in a region behind non-illustrated vehicle seats. In this case, the rollover protection device 2 is triggered by a non-illustrated sensor if a movement triggering an overturning of the motor vehicle 1 takes place. The rollover protection device 2 has extendable rollbars 14, 14' which are disposed in rollover protection cassettes 3, 3' and are extended only if the need arises. A detailed illustration of the rollover protection device 2 configured according to FIG. 1 is illustrated in FIG. 2.

According to the invention, at least one rollover protection cassette 3, and, if the motor vehicle 1 has two rollover protection cassettes 3, 3', both rollover protection cassettes, or a housing of the same is or are configured as a supporting component of a stiffening support 4 which is of multi-part construction and extends in the transverse direction of the vehicle. This affords the great advantage that the two rollover protection cassettes 3, 3' do not have to be disposed in front of or behind a crossmember in the direction of travel, this resulting in an increased requirement for construction space in the longitudinal direction of the vehicle.

Figure 2:
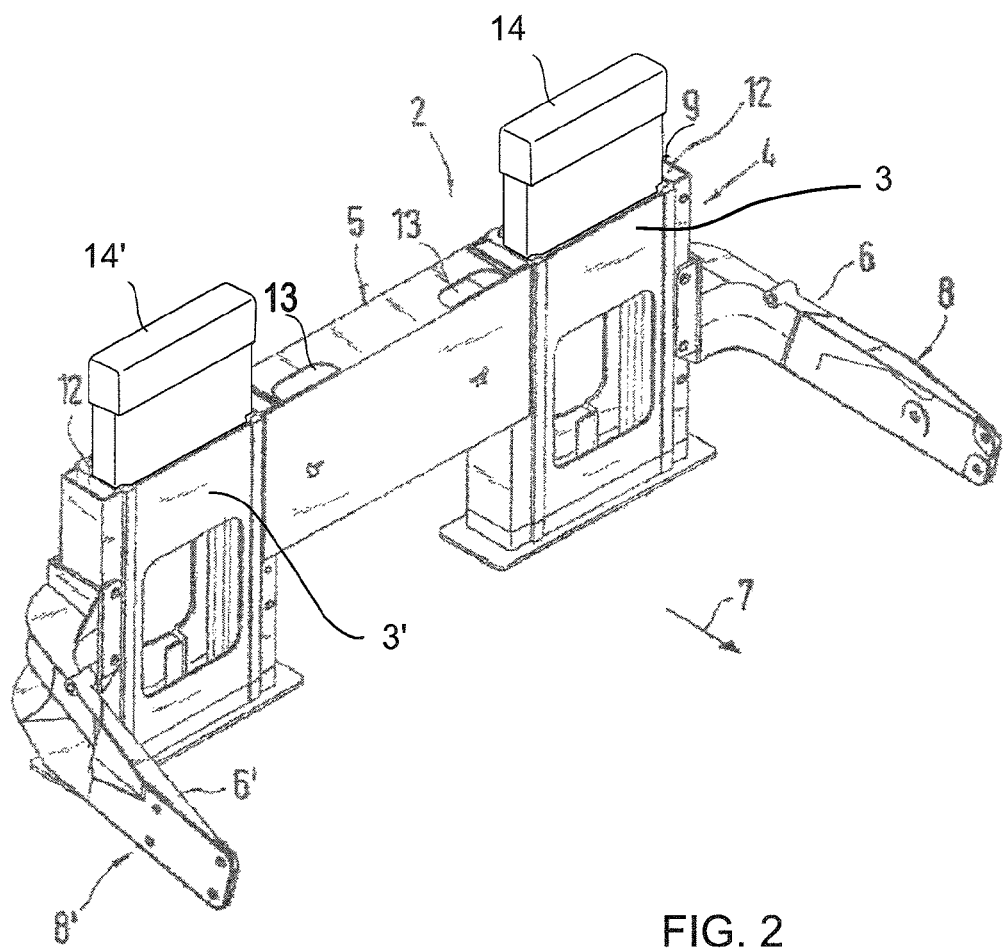
FIG. 2 is a diagrammatic, perspective view of a detailed illustration of the rollover protection device.

Looking at FIG. 2, it can be seen that the rollover protection device 2 contains two rollover protection cassettes 3, 3' and a connecting profile 5 which extends in the transverse direction of the vehicle and is disposed between the two rollover protection cassettes 3, 3'. Furthermore, a joining arm 6 via which the stiffening support 4, in particular the rollover protection cassette 3, is joined to a vehicle structure, is arranged on that side of the rollover protection cassette 3 which faces away from the connecting profile 5. On the opposite side, the joining arm 6' is connected in the same manner to the vehicle structure or to the rollover protection cassette 3'. The individual components 3, 3', 5, 6, 6' can be, for example, welded, screwed or riveted to one another. The components of the rollover protection device 2 are preferably formed from metal, in particular from light metal or from cast metal, in order, first, to be able to provide the required rigidity and, second, to be able to keep the weight of the rollover protection device 2 according to the invention as low as possible.

In a respective foot region of the two rollover protection cassettes 3, 3', the latter are joined to a supporting structure of the vehicle, in particular to a seat trough or to a crossmember of the vehicle, thus enabling additional stiffening to be achieved.

Looking at FIGS. 1 and 2, it is obvious that the two joining arms 6 and 6' are configured such that they are angled forward in the direction of travel 7, with them being connected by their angled region 8, 8' to a non-illustrated B pillar of the motor vehicle 1 and/or to a convertible top bearing and/or to a wheelhouse. The two joining arms 6, 6' are of profiled construction here, as a result of which the rigidity thereof can be increased. Depending on the embodiment or depending on the variant of the motor vehicle 1, it can be provided that those regions 8, 8' of the joining arms 6, 6' which are angled forward in the direction of travel 7 run approximately horizontally, as shown in FIG. 2, or obliquely downward and, as a result, are joined to the B pillar in an upper, a central or a lower region thereof. For the joining, the angled regions 8, 8' have an essentially planar bearing surface which is provided with passage openings for the passage of connecting device, in particular screws.

Figure 3A:
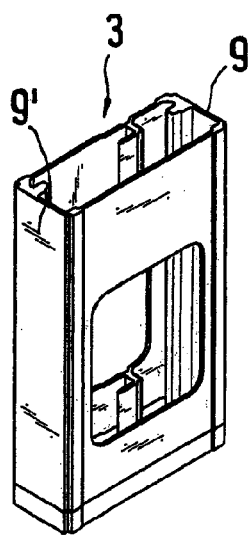
FIGS. 3A to 3C are diagrammatic, perspective views showing different embodiments of the rollover protection cassettes.
Figure 3B:
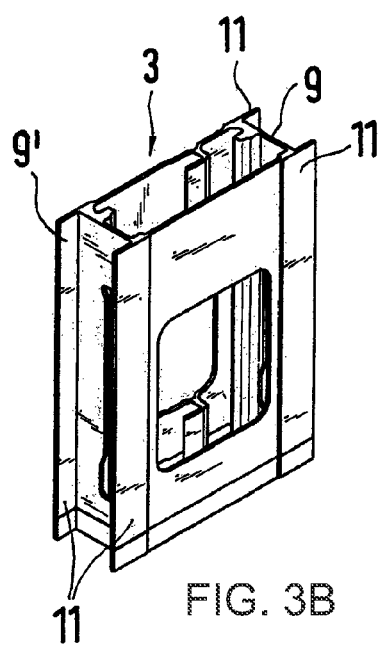
Figure 3C:
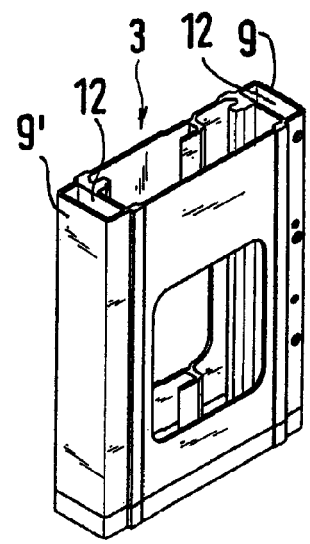

Different embodiments of the rollover protection cassettes 3 are illustrated in FIGS. 3A to 3C, with in each case two laterally protruding flanges 11 being guided away from lateral walls 9 and 9' of the rollover protection cassette 3 in FIG. 3B while the lateral walls 9, 9' in the rollover protection cassette 3 according to FIG. 3C are configured as a hollow profile 12. By contrast, the lateral walls 9, 9' in the rollover protection cassette 3 according to FIG. 3A are configured as a merely thin wall without additionally stiffening cross-sectional profiles. In comparison to the rollover protection cassette 3 according to FIG. 3A, the rollover protection cassettes 3 according to FIGS. 3B and 3C have increased rigidity.

Figure 4:
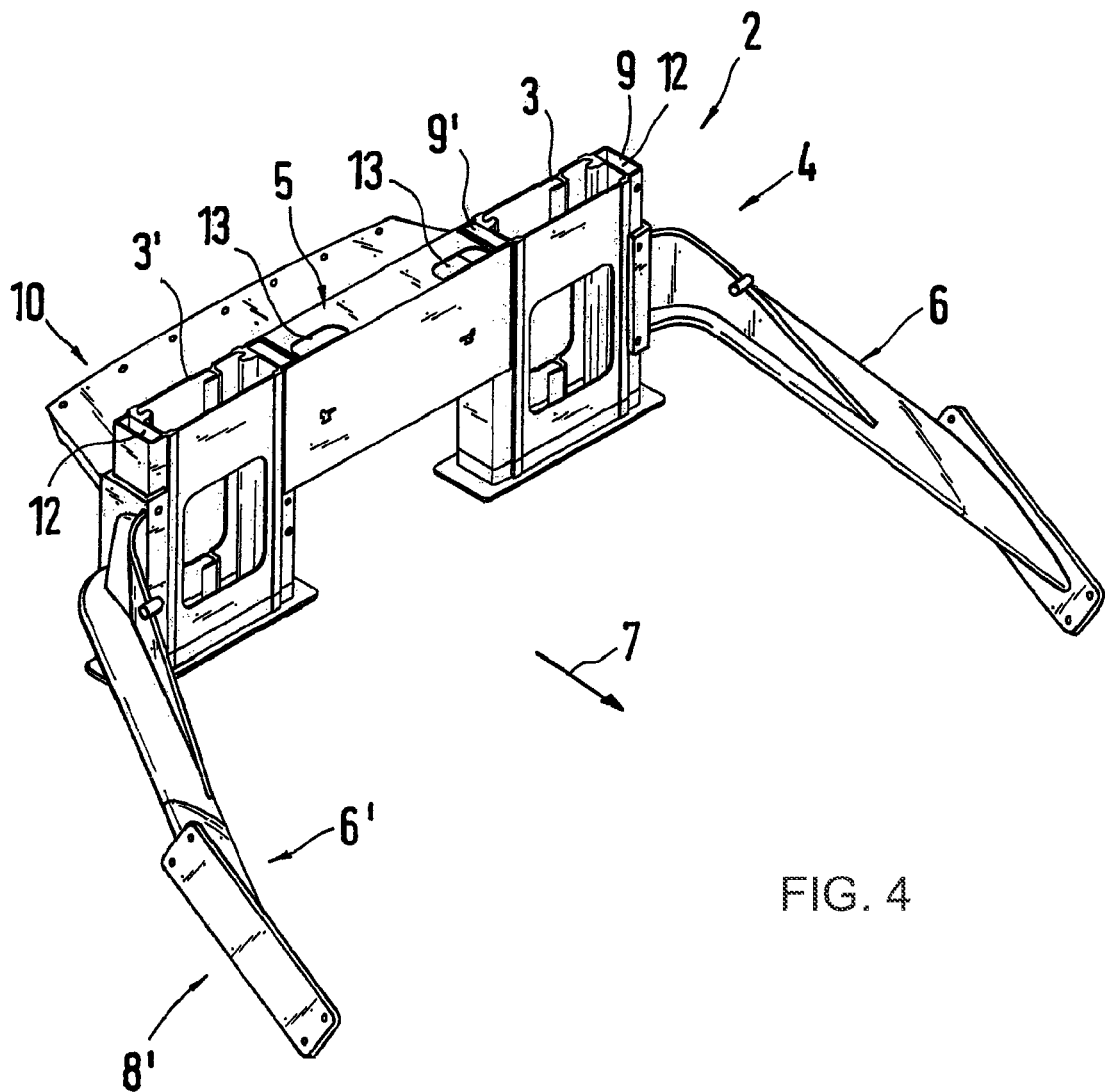
FIG. 4 is a diagrammatic, perspective view showing an illustration as in FIG. 2, but for a different embodiment, in particular with different joining arms.

Depending on the embodiment of the lateral walls 9, 9' of the rollover protection cassette 3, corresponding joining regions of the connecting profile 5 and of the joining arms 6, 6' are formed, and therefore the joining regions, for example according to FIG. 4, have a U-shaped cross section and engage around the rollover protection cassette 3 surrounding it on three sides.

In general, it is conceivable for at least one of the components, for example the rollover protection cassettes 3 or the connecting profile 5 of the rollover protection device 2, to be configured as extruded profiles. It is likewise conceivable for, for example, the joining arms 6, 6' to be configured as profiled supports, as shown in FIG. 2, or else, as shown in FIG. 4, to have a tubular cross section. Both selected cross-sectional shapes impart significantly increased rigidity to the joining arms 6, 6'. In contrast to the rollover protection device 2 according to FIG. 2, the rollover protection device 2 according to FIG. 4 additionally has a plate-like stiffening element 10 which protrudes to the rear in the direction of travel 7 and via which the rollover protection device 2 is supported to the rear in the longitudinal direction of the vehicle, in particular on a convertible top store.

In contrast to the rollover protection devices known from the prior art, the rollover protection device 2 according to the invention requires significantly reduced construction space in the longitudinal direction of the vehicle, since the rollover protection cassettes 3, 3' and the connecting profile 5 are not arranged parallel in the transverse direction of the vehicle in front of or behind a crossmember but rather replace the latter.

It can be seen in FIG. 2 that seat belt retractors (not illustrated specifically) of a seat belt system are arranged in laterally outer regions of the connecting profile 5 which extends in the transverse direction of the vehicle. The two seat belt retractors are arranged in the cavity of the connecting profile 5 and are fastened there. Outlet openings 13 for the seat belts are provided locally on the upper side of the connecting profile 5.

The invention claimed is:

1. A rollover protection device disposed behind vehicle seats of a motor vehicle, being a convertible with a convertible top, the rollover protection device comprising:
    two rollover protection cassettes each containing an extendible rollbar and a housing, said rollover protection cassettes including an actuator for triggering said rollbar, one of said rollover protection cassettes and said housing being a supporting component of a stiffening support being of multi-part construction and extending in a transverse direction of the motor vehicle;
    a connecting profile extending in the transverse direction of the motor vehicle and disposed between said two rollover protection cassettes; and
    two joining arms via which said two rollover protection cassettes are joined to a supporting structure of the motor vehicle.

2. The rollover protection device according to claim 1, wherein components of said rollover protection device are one of welded, screwed, and riveted to one another.

3. The rollover protection device according to claim 2, wherein said components of said rollover protection device are formed from a material selected from the group consisting of metals, light metals and cast metals.

4. A rollover protection device disposed behind vehicle seats of a motor vehicle, being a convertible with a convertible top, the rollover protection device comprising:
    at least one rollover protection cassette containing an extendible rollbar and a housing, said rollover protection cassette including an actuator for triggering said rollbar, one of said rollover protection cassette and said housing being a supporting component of a stiffening support being of multi-part construction and extending in a transverse direction of the motor vehicle; and
    a plate-shaped stiffening element via which the rollover protection device is supported to a rear in a longitudinal direction of the motor vehicle.

5. The rollover protection device according to claim 1, wherein at least one of said rollover protection cassettes or said housing thereof has a foot region joined to the supporting structure of the motor vehicle.

6. The rollover protection device according to claim 1, wherein at least one of said two joining arms is configured such that said one joining arm is angled forward in a direction of travel and has an end facing away from the rollover protection cassette being joined to at least one of a B pillar, a convertible top bearing and a wheelhouse of the motor vehicle.

7. The rollover protection device according to claim 6, wherein a region of said at least one joining arm which is angled forward in the direction of travel runs one of approximately horizontally and approximately obliquely downward and is joined to the B pillar in one of an upper region, a central region and a lower region thereof.

8. The rollover protection device according to claim 2, wherein at least one of said components of said rollover protection device is an extruded profile.

9. The rollover protection device according to claim 4, wherein said plate-shaped stiffening element is supported to the rear in the longitudinal direction of the motor vehicle against a convertible top store.

10. The rollover protection device according to claim 5, wherein said foot region is joined to one of a seat trough and a crossmember of the motor vehicle.

11. A motor vehicle, comprising:
    two rollover protection cassettes each containing an extendible rollbar and a housing, said rollover protection cassettes including an actuator for triggering said rollbar, one of said rollover protection cassettes and said housing being a supporting component of a stiffening support being of multi-part construction and extending in a transverse direction of the motor vehicle;
    a connecting profile extending in the transverse direction of the motor vehicle and disposed between said two rollover protection cassettes; and
    two joining arms via which said two rollover protection cassettes are joined to a supporting structure of the motor vehicle.

* * * * *

UNITED STATES PATENT AND TRADEMARK OFFICE
Certificate

Patent No. 7,871,107 B2                                                Patented: January 18, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Josip Vlahovic, Freiberg am Neckar (DE); Ali Oezkan, Leonberg (DE); Klaus Bohnert, Muehlacker (DE); Hans-Jürgen Schmitt, Muehlacker (DE); Felix Hermann, Leonberg (DE); and Dominik Beierl, Korntal-Muenchingen (DE).

Signed and Sealed this Eleventh Day of March 2014.

*PAUL N. DICKSON*
*Supervisory Patent Examiner*
Art Unit 3616
Technology Center 3600